United States Patent
Kim et al.

(10) Patent No.: US 7,642,668 B2
(45) Date of Patent: Jan. 5, 2010

(54) POWER TRANSMISSION APPARATUS FOR WIND GENERATOR

(75) Inventors: Doo-hoon Kim, Cheonan-si (KR); Ji-yoon Ryu, Cheonan-si (KR); Jin-il Park, Yongin-si (KR); Chul-jin Byun, Suwon-si (KR); Jin-su Hwang, Cheongju-si (KR); Chin-wha Chung, Pohang-si (KR); Chung-hwan Chun, Gleichen (DE)

(73) Assignee: Unison Co., Ltd., Cheonan-si (KR)

( * ) Notice: Subject to any disclaimer, the term of this patent is extended or adjusted under 35 U.S.C. 154(b) by 1 day.

(21) Appl. No.: 11/913,070

(22) PCT Filed: Mar. 14, 2007

(86) PCT No.: PCT/KR2007/001243

§ 371 (c)(1),
(2), (4) Date: Oct. 30, 2007

(87) PCT Pub. No.: WO2007/111425

PCT Pub. Date: Oct. 4, 2007

(65) Prior Publication Data

US 2008/0272602 A1    Nov. 6, 2008

(30) Foreign Application Priority Data

Mar. 24, 2006    (KR) ............. 10-2006-0027052

(51) Int. Cl.
*F03D 11/00*    (2006.01)
(52) U.S. Cl. .................................. 290/55
(58) Field of Classification Search ............ 290/55
See application file for complete search history.

(56) References Cited

U.S. PATENT DOCUMENTS

| 6,285,090 | B1 * | 9/2001 | Brutsaert et al. | 290/55 |
| 6,452,287 | B1 * | 9/2002 | Looker | 290/55 |
| 6,483,199 | B2 * | 11/2002 | Umemoto et al. | 290/55 |
| 6,759,758 | B2 * | 7/2004 | Torres Martinez | 290/55 |

(Continued)

FOREIGN PATENT DOCUMENTS

EP    1207299 A2 *    5/2002

(Continued)

*Primary Examiner*—Joseph Waks
(74) *Attorney, Agent, or Firm*—Oblon, Spivak, McClelland, Maier & Neustadt, L.L.P.

(57) ABSTRACT

Disclosed is a power transmission apparatus for a wind generator having an electric generator connected to an apparatus rotor by a main shaft. The electric generator includes a generator rotor and a generator stator. The electric generator may be assembled to the main shaft via the generator rotor, but the generator stator is not assembled to the main shaft. Instead, the generator stator is connected to a stator housing fixed to bearing housings respectively provided on a pair of bearings disposed on an outer surface of a rotor bearing. The rotor bearing is disposed perpendicular to a vertical rotor frame, is formed integrally with the generator rotor, and is connected to an outer surface of the main shaft. The apparatus permits the generator stator to be assembled with a circumference of the generator rotor. The apparatus provides increased convenience and efficiency in assembly.

7 Claims, 6 Drawing Sheets

U.S. PATENT DOCUMENTS

| | | | |
|---|---|---|---|
| 6,911,741 B2 * | 6/2005 | Pettersen et al. | 290/44 |
| 6,975,045 B2 * | 12/2005 | Kurachi et al. | 290/44 |
| 7,042,109 B2 * | 5/2006 | Gabrys | 290/44 |
| 7,154,193 B2 * | 12/2006 | Jansen et al. | 290/55 |
| 7,179,056 B2 * | 2/2007 | Siegfriedsen | 416/170 R |
| 7,183,665 B2 * | 2/2007 | Bywaters et al. | 290/55 |
| 7,218,011 B2 * | 5/2007 | Hiel et al. | 290/43 |
| 2004/0041409 A1 * | 3/2004 | Gabrys | 290/55 |
| 2006/0001269 A1 | 1/2006 | Jansen et al. | |
| 2007/0102934 A1 * | 5/2007 | Pescarmona et al. | 290/44 |
| 2008/0199309 A1 * | 8/2008 | Bagepalli et al. | 415/170.1 |

FOREIGN PATENT DOCUMENTS

| | | |
|---|---|---|
| JP | 2001 304094 | 10/2001 |
| JP | 2002 303254 | 10/2002 |
| JP | 2006 46107 | 2/2006 |
| WO | WO 2007111425 A1 * | 10/2007 |

* cited by examiner

US 7,642,668 B2

POWER TRANSMISSION APPARATUS FOR WIND GENERATOR

CROSS-REFERENCE TO RELATED APPLICATIONS

The present non-provisional application claims priority from PCT Patent Application No. PCT/KR2007/01243 filed on Mar. 14, 2007, the entire subject matter of which is incorporated herein by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC.

Not applicable.

BACKGROUND OF THE INVENTION

1. Field of the Invention

The present invention relates to a power transmission apparatus for a wind generator.

2. Description of Related Art

As well known to those skilled in the art, wind generators generate electricity using the power of an apparatus rotor, which is rotated by wind. Generally, a wind generator is configured such that a tower is installed at a designated height above the ground and an apparatus rotor having a plurality of rotating blades and a generator are connected by a main shaft above the tower so as to transmit the rotary power of the apparatus rotor to the generator through the main shaft.

In the apparatus rotor, the plurality of rotating blades is fixed along the circumferential surface of a rotor hub formed at the front end of the main shaft by blade fixtures. The blade fixtures use a conventional method, such as bolt fastening.

FIG. 6 is a sectional view illustrating the internal structure of a conventional wind generator. As shown in FIG. 6, the generator 4 includes a stator 411 and a rotor 412, which are spaced from each other by a designated interval, and the main shaft 2, both ends of which are supported by a front bearing 5 and a rear bearing 6, is divided into a turbine shaft 2a and a generator shaft 2b, which are connected by a flange joint 2c. Further, the rotor 412 is connected to the generator shaft 2b and is rotated together with the rotation of the generator shaft 2, and generates electricity due to the electrical action with the stator 411.

Now, the connection structure of the stator 411 and the rotor 412 to the generator shaft 2b will be described in more detail. Both ends of the generator shaft 2b are supported by bearings 413, a stator housing 411a is connected to the bearings 413, and a rotor body 412a is connected directly to the generator shaft 2b.

In the conventional wind generator, when the stator 411 and the rotor 412 are connected to the generator shaft 2b, the assembly of the stator housing 411a to the electric bearings 413 and the connection of the rotor body 412a directly to the generator shaft 2b are separately carried out, thus causing troublesome and inconvenience in assembly and deteriorating efficiency in assembly. Now, the connection structure of the stator 411 and the rotor 412 to the generator shaft 2b will be described in more detail. Both ends of the generator shaft 2b are supported by electric bearings 413, and a stator housing 411a is connected to the electric hearings 413, and a rotor body 412a is connected directly to the generator shaft 2b. In the conventional wind turbine, when the stator 411 and the rotor 412 are connected to the generator shaft 2b, the assembly of the stator housing 411a to the electric bearing 413 and the connection of the rotor body 412a directly to the generator shaft 2b are separately carried out, thus causing troublesome and inconvenience in assembly and deteriorating efficiently in assembly.

The main shaft 2 is divided into the turbine shaft 2a and the generator shaft 2b, which are connected by the flange joint 2c, as described above, and thus causes a loss in transmission of rotational torque.

Generally, in a generator or a motor, over-current flows in wires inside a stator due to natural degradation, physical defects, or overload, and the insulation between the wires in the stator is destroyed by the repetition of the above overcurrent flow, thus causing a short. In this case, counter torque due to over-current is produced in the generator.

The conventional wind generator is not provided with any unit for preventing the above counter torque caused by the short, thus having many defects, such as damage to the wind generator, shortening of the life span of the wind generator, and a difficulty in maintenance and repair of the wind generator.

Further, in case that the misalignment and the tilting of the main shaft are generated, the conventional wind generator does not have a self-aligning function of the main shaft, and thus causes inaccuracy in power transmission and operation due to the misalignment and the tilting of the main shaft.

SUMMARY OF INVENTION

Therefore, the present invention has been made in view of the above problems, and it is an object of the present invention to provide a power transmission apparatus for a wind generator, in which the assembly of a rotor and a stator of a generator with a main shaft connecting an apparatus rotor and the generator is completed only by assembling the rotor of the generator with the main shaft without assembling the stator of the generator with the main shaft.

It is another object of the present invention to provide a power transmission apparatus for a wind generator, which cuts off the connection of a main shaft and a rotor, when counter torque is generated by over-current due to a short of a generator, thus preventing damage to the overall system due to overload.

It is another object of the present invention to provide a power transmission apparatus for a wind generator, which has a self-aligning function of a main shaft in case that the misalignment and the tilting of the main shaft are generated.

It is yet another object of the present invention to provide a power transmission apparatus for a wind generator, which excludes vibration and noise, transmitted from a generator supported by a shaft housing, using a supporter.

In accordance with an aspect of the present invention, the above and of the objects can be accomplished by the provision of a power transmission apparatus for a wind generator, in which an apparatus rotor and the generator are connected by a main shaft rotatably supported by both bearings and the generator includes a stator and a rotor, wherein a rotor bearing being perpendicular to a vertical rotor frame is formed integrally with the rotor of the generator and is connected to the outer surface of the main shaft, a pair of bearings is disposed at the outer surface of the rotor bearing, and the stator of the generator is assembled with the circumference of the rotor of the generator by fixing a stator housing to bearing housings respectively provided on the pair of bearings.

The outer circumferences of the bearing housing may be respectively fixed to the stator housing by bolts, and each of the bearing housings may include a housing surrounding the inside of an outer wheel of each of the bearings and the outer wheel of each of the bearings, and a cover fixed to the outer end of the housing to press the outer wheel of each of the bearings inwardly.

Pushing units to respectively push inner wheels of the respective bearings inwardly may be provided on the outer circumference of the rotor bearing at the outside of the respective bearings, and each of the pushing units may include a spiral part formed at the outer circumference of the rotor bearing, a contact ring closely contacting the inner wheel of the bearing, and a pushing nut coupled with the spiral part to push the contact ring inwardly.

The rotor bearing may be fixed closely to the main shaft at a designated frictional force by the tightening force of bolts so that the rotor bearing can be rotated together with the rotation of the main shaft, and include a shrink disc cutting off the connection between the rotor bearing and the main shaft when the rotational torque of the main shaft exceeds the frictional force.

The main shaft may be an integral shaft, the one bearing of the pair of the bearings may be a toroidal roller bearing, and the other bearing of the pair of the bearings may be a spherical roller bearing.

The generator may be supported by a supporter connected to a shaft housing provided at the outside of the main shaft, and dampers may be provided between the supporter and the generator.

BRIEF DESCRIPTION OF DRAWING(S)

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
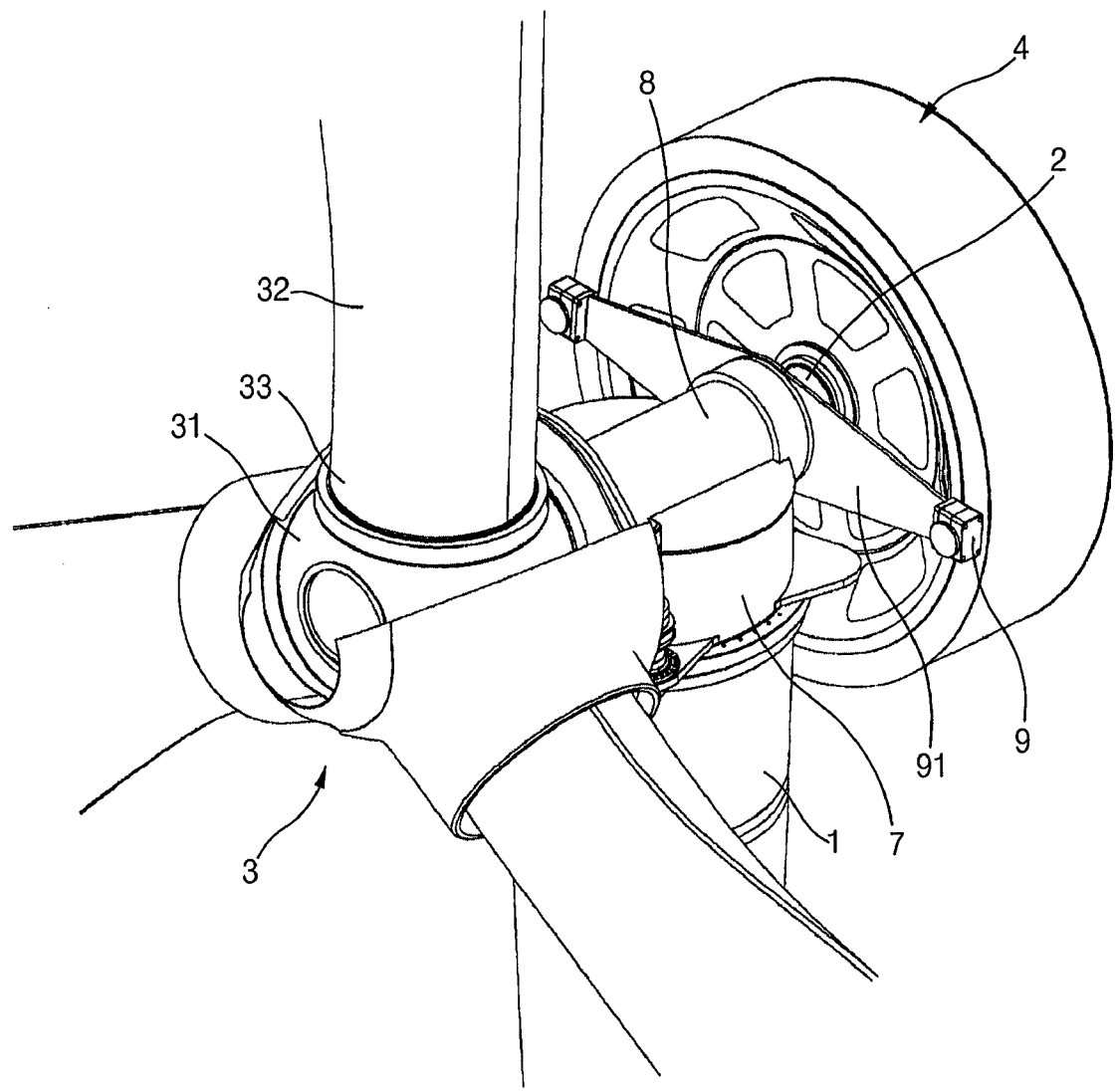
FIG. 1 is a perspective view of a wind generator in accordance with the present invention.

FIG. 1 is a perspective view of a wind generator in accordance with the present invention.

As shown in FIG. 1, the wind generator in accordance with the present invention is configured in the same manner as the conventional wind generator. That is, a tower 1 is installed at a designated height above the ground and an apparatus rotor 3 having a plurality of rotating blades 32 and a generator 4 are connected by a main shaft 2 above the tower 1 so as to transmit the rotary power of the apparatus rotor 3 to the generator 4.

In the apparatus rotor 3, the plurality of rotating blades 32 is fixed along the circumferential surface of a rotor hub 31 formed at the front end of one side of the main shaft 2 by blade fixtures 33. The blade fixtures 33 use a conventional method, such as bolt fastening.

The apparatus rotor 3 and the generator 4 are connected by the main shaft 2, and a main frame 7 is rotated on the axis of the tower 1 by the power of a motor.

Figure 2:
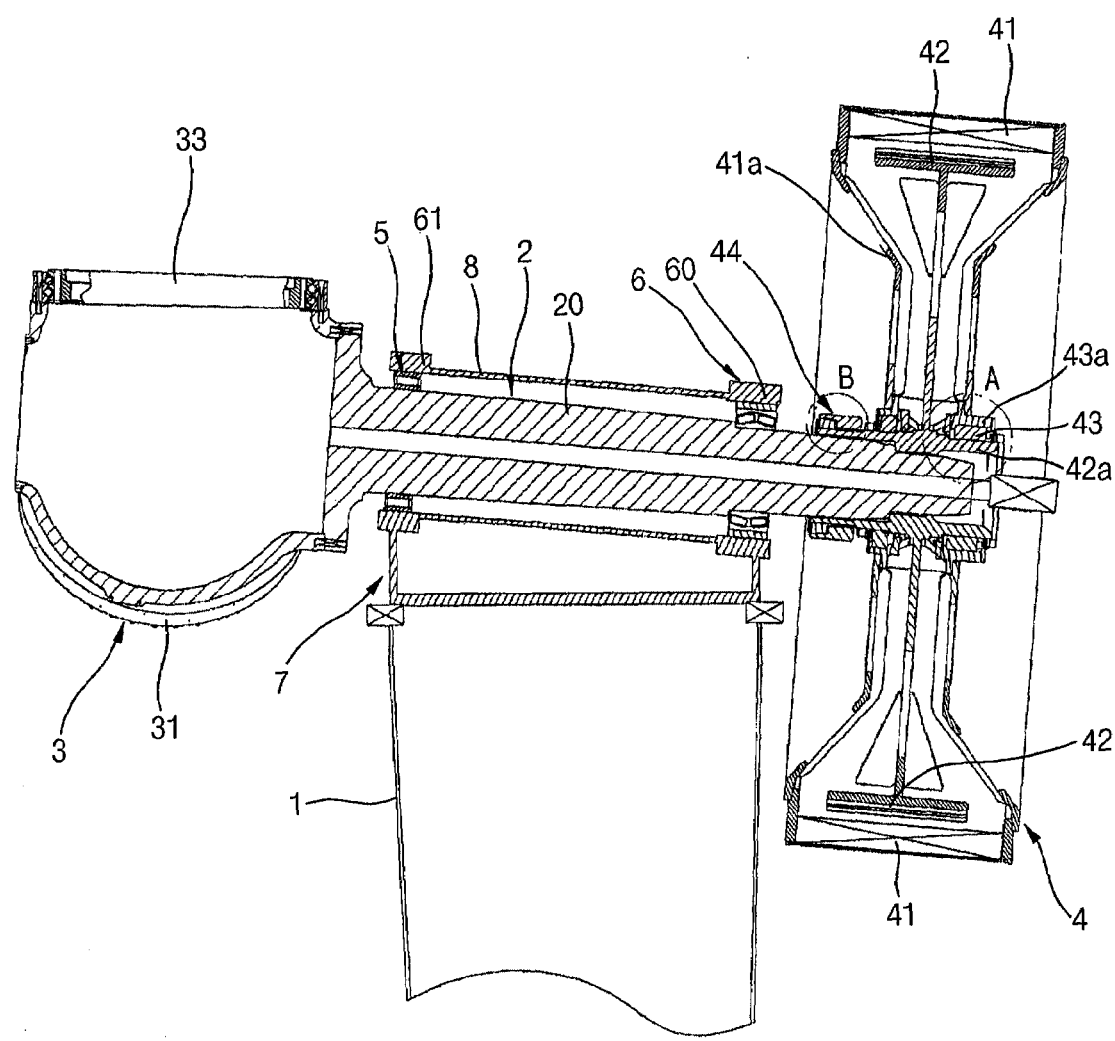
FIG. 2 is a sectional view illustrating the internal structure of the wind generator of FIG. 1.
Figure 3:
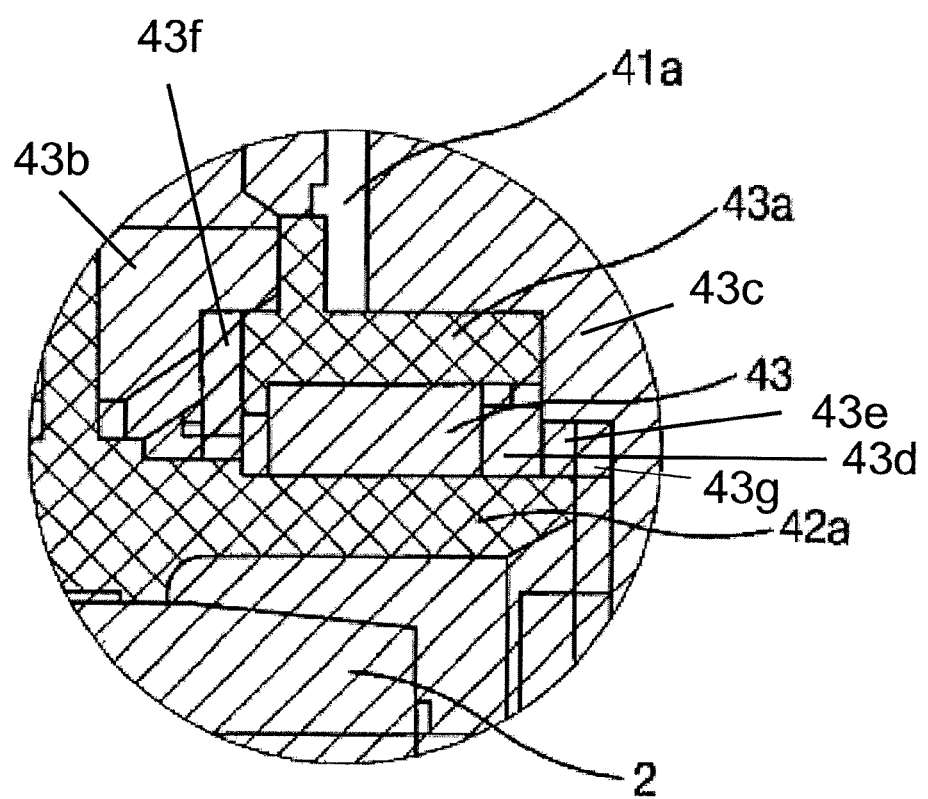
FIG. 3 is an enlarged view of the portion "A" of FIG. 2.

In the wind generator, as shown in FIGS. 2 and 3, a rotor 42 is connected to the main shaft 2 composed of an integral shaft 20, and a stator 41 is assembled with the rotor 42 by means of a stator housing 41a. Therefore, the assembly of the stator 41 and the rotor 42 with the main shaft 2 is achieved only by assembling the rotor 42 with the main shaft 2.

Now, the assembly of the stator 41 and the rotor 42 with the main shaft 2 will be described in more detail. A rotor bearing 42a having a tubular shape, which is perpendicular to a vertical rotor frame 42b, is formed integrally with the middle portion of the rotor 42 and is connected directly to the outer surface of the main shaft 2.

A pair of bearings 43 is provided at both sides of the outer circumference of the rotor bearing 42a, and both bearings 43 are fixedly installed by bearing housings 43a fixed to the stator housing 41a.

That is, the outer circumferences of the bearing housings 43a are respectively fixed to the stator housing 41a by bolts, and each of the bearing housings 43a includes a housing 43b surrounding the inside of an outer wheel of each of the bearings 43 and the outer wheel of each of the bearings 43, and a cover 43c fixed to the outer end of the housing 43b to press the outer wheel of each of the bearings 43 inwardly.

Further, pushing units 43d to respectively push inner wheels of the respective bearings 43 inwardly are provided on the outer circumference of the rotor bearing 42a at the outside of each of the respective bearings 43. That is, each of the pushing units 43d includes a spiral part 43e formed at the outer circumference of the rotor bearing 42a, a contact ring 43f closely contacting the inner wheel of the bearing 43, and a pushing nut 43g coupled with the spiral part 43e to push the contact ring 43f.

Further, both bearings 43 are radial bearings.

Therefore, the rotor 43 is smoothly rotated under the condition that the stator 41 and the rotor are integrated into one body by fixing the bearing housings 43a of the bearings 43 to the stator housing 41a. That is, the rotor bearing 42a connected with the rotor 42 by the rotor frame 42b is rotated together with the rotation of the main shaft 2, and both bearings 43 serve to reduce friction between the stator housing 41a, which is not rotated, and the rotor bearing 42a, which is rotated.

Accordingly, the assembly of the stator 41 with the main shaft 2 and the assembly of the rotor 42 with the main shaft 2 are simultaneously achieved only by assembling the rotor 42 with the main shaft 2 without a separate process for assembling the stator 41 with the main shaft 2. Thereby, the wind generator of the present invention assures high efficiency and convenience in assembly.

When counter torque is generated by over-current due to a short of a generator, an overall system is overloaded. The rotor bearing 42a includes a shrink disc 44 for cutting off the connection between the main shaft 2 and the rotor 42 in such a case.

Figure 4:
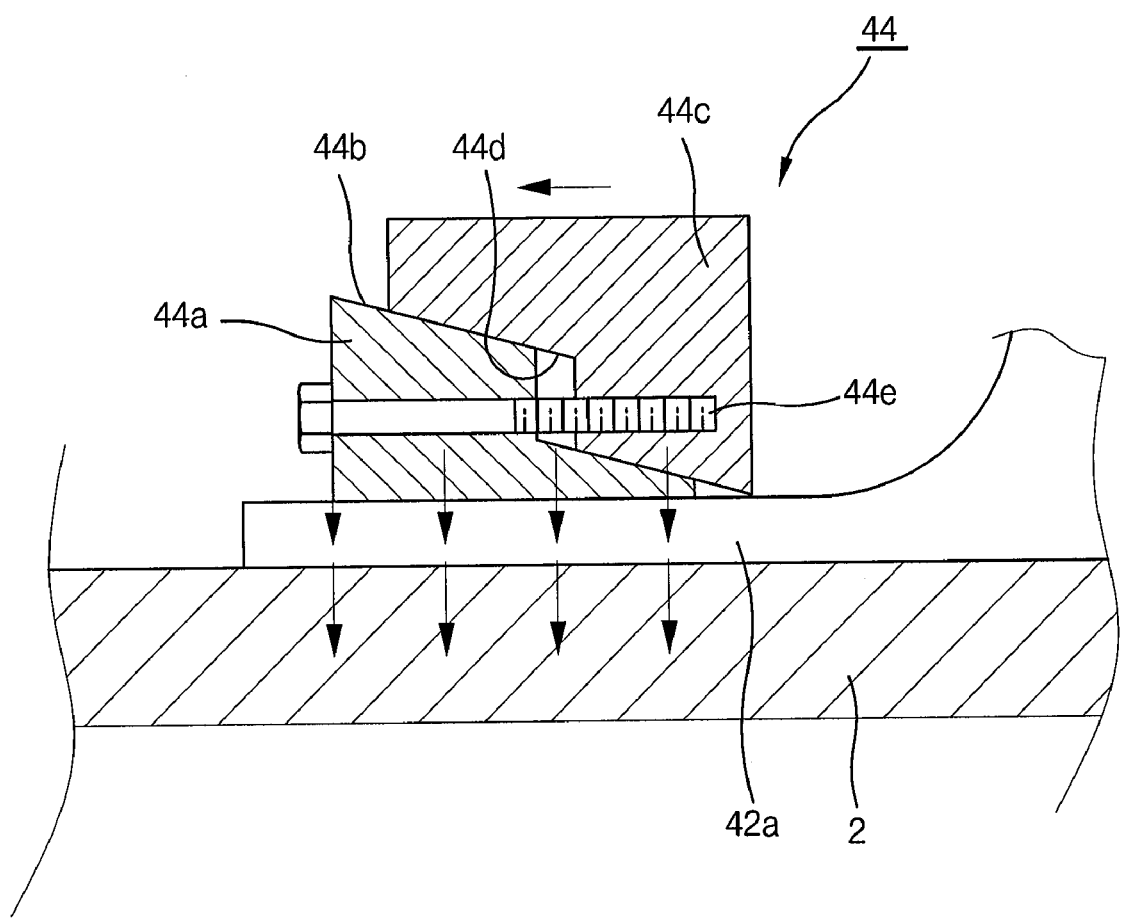
FIG. 4 is an enlarged view of the portion "B" of FIG. 2.

The shrink disc 44, as shown in FIG. 4, includes a stationary disc 44a fixed to the outer surface of the rotor bearing 42a and a movable disc 44c fastened to the outer surface of the stationary disc 44a by bolts 44e. The stationary disc 44a and the movable disc 44c are respectively provided with an incline plane 44b and an opponent incline plane 44d, which contact each other.

When the bolts 44e are tightened up, the opponent incline plane 44d of the movable disc 44c moves along the incline plane 44b of the stationary disc 44a in the direction of the arrow by the tightening force of the bolts 44e, thus fixing the rotor bearing 42a closely to the main shaft 2 at a designated pressure, i.e., frictional force.

When the rotational torque of the main shaft 2 exceeds the above frictional force, sliding occurs on an interface and the main shaft 2 idles against the rotor bearing 42a. Thereby, the connection between the main shaft 2 and the rotor 42 is cut off.

In the present invention, among both bearing 5 and 6 to ratably support the main shaft 2, one bearing 5 is composed of a toroidal roller bearing 61, and the other bearing 6 is composed of a spherical roller bearing 60, thus being capable of compensating for the misalignment and the tilting of the main shaft 2. This is achieved by self-aligning and axial directional compensating properties of the commonly-known toroidal roller bearing 61, which includes an outer wheel having a spherical raceway, an inner wheel, and rolling elements connected to the inner wheel. Here, non-described reference numeral 8 represents a shaft housing.

The generator 4, as shown in FIG. 1, is supported by the shaft housing 8 using a supporter 91. The supporter 91 is connected to the generator 4 by dampers 9.

Figure 5:
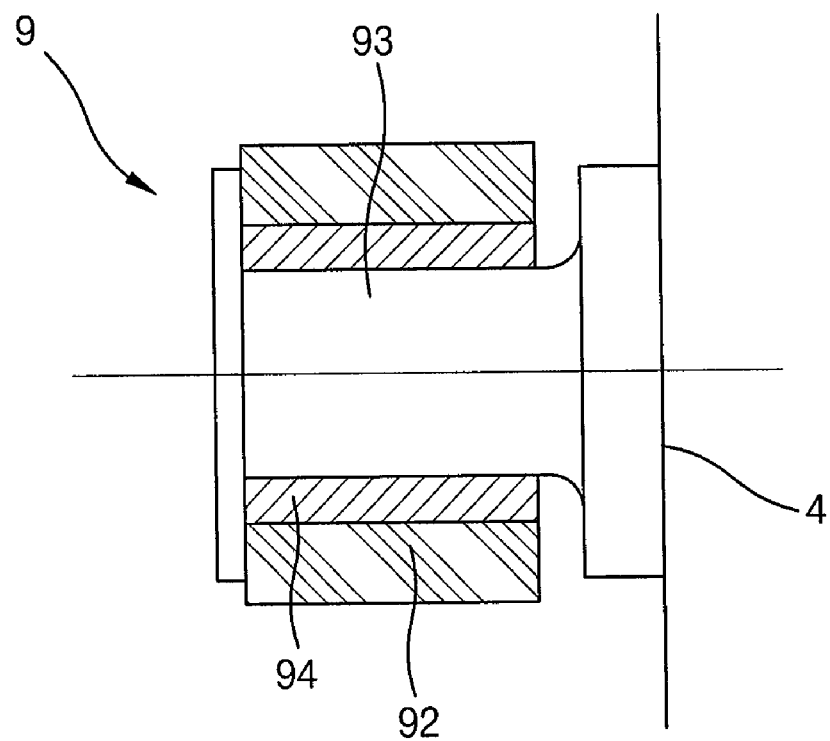
FIG. 5 is a sectional view illustrating the structure of a damper of FIG. 1.
Figure 6:
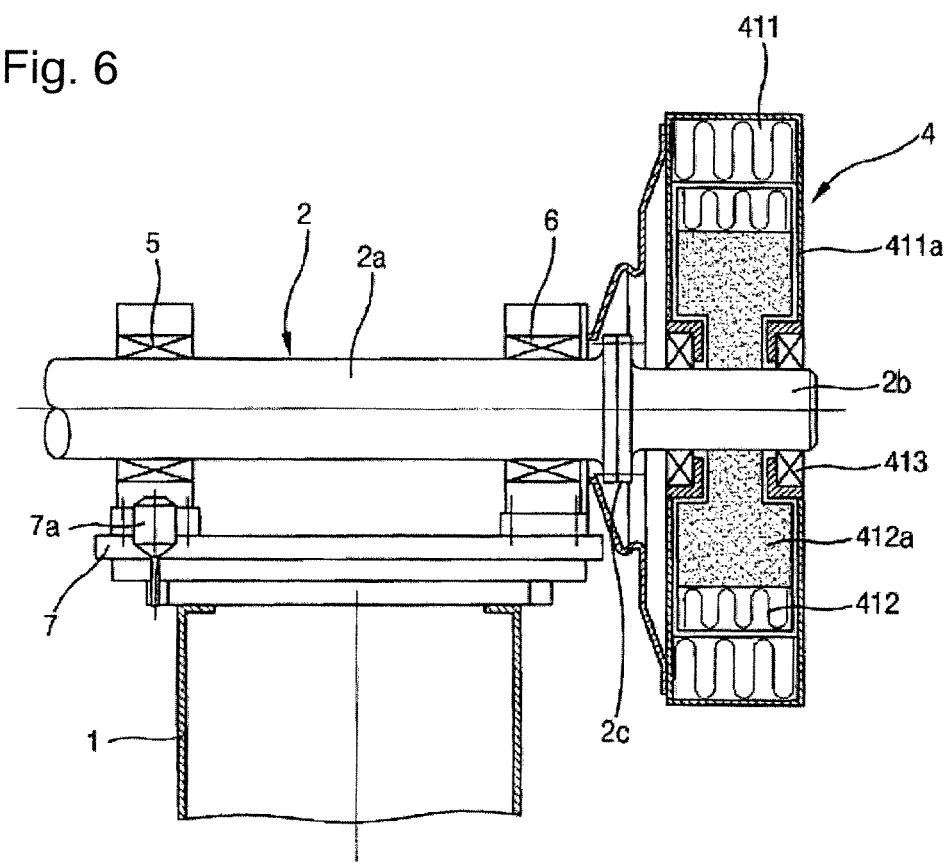
FIG. 6 is a sectional view of a conventional wind generator.

The damper 9, as shown in FIG. 5, includes a support axis 93 formed integrally with the outer surface of the generator 4, a damper body 92 connected to the supporter 91, and a vibration absorbing rubber 94 provided between the support axis 93 and the damper body 92.

The generator 4, as shown in FIG. 2, includes the rotor 42 installed at the main shaft 2 and the stator 41 fixed to the inside of the stator housing 41a, and generates electricity by means of the rotation of the rotor 42. Here, the stator housing 41a is supported so as not to be affected by the torque of the rotor 42. For this reason, as shown in FIG. 1, the stator housing 41a is supported by the shaft housing 8 by the supporter 91, and the above-described dampers 9 are provided between the supporter 91 and the stator housing 41a so as to exclude vibration and noise transmitted through the stator housing 8.

In the present invention, the rotary power of the apparatus rotor 3 is transmitted to the rotor bearing 42a through the main shaft 2 composed of the integral shaft 20. Then, since the bearings 43 are interposed between the rotor bearing 42a and the stator housing 41a, the rotor 42 is rotated against the stator 41.

In case that a short of the generator 4 is generated, the shrink disc 44, which cuts off the connection between the rotor bearing 42a and the main shaft 2 when the rotary power of the main shaft 2 exceeds a designated pressure, prevents damage to the overall system due to overload.

Among the front and rear bearings 5 and 6 for rotatably supporting the main shaft 2, the front bearing 5 is composed of the toroidal roller bearing 61 and the rear bearing 6 is composed of the spherical roller bearing 60, thus compensating for the misalignment and the tilting of the main shaft 2.

As apparent from the above description, the present invention provides a power transmission apparatus for a wind generator, in which the assembly of a rotor and a stator of a generator with a main shaft connecting an apparatus rotor and the generator is completed only by assembling the rotor of the generator with the main shaft without assembling the stator of the generator with the main shaft, thus improving convenience and efficiency in assembly.

The power transmission apparatus of the present invention includes a shrink disc cutting off the connection between the main shaft and the rotor, when counter torque is generated by over-current due to a short of the generator and the rotary power of the main shaft exceeds a designated torque, thus preventing damage to the overall system due to overload. Thereby, it is possible to assure the safety of the wind generator and improve the performance and reliability of the wind generator.

The power transmission apparatus of the present invention uses an integral shaft as the main shaft and a toroidal roller spring having a self-aligning function and a spherical roller spring as bearings for rotatably supporting the main shaft, thereby compensating for the misalignment and the tilting of the main shaft and thus improving accuracy in operation.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A power transmission apparatus for a wind generator, comprising:

an apparatus rotor; and an electric generator connected by a main shaft rotatably supported by a pair of first bearings, and the electric generator includes a generator stator and a generator rotor, wherein a rotor bearing being perpendicular to a vertical rotor frame formed integrally with the generator rotor and is connected to the outer surface of the main shaft, a pair of second bearings is disposed at the outer surface of the rotor bearing, and the generator stator is assembled with a circumference of the generator rotor by fixing a stator housing to bearing housings respectively provided on the pair of second bearings.

2. The power transmission apparatus according to claim 1, wherein the rotor bearing is fixed closely to the main shaft at a designated frictional force by a tightening force of bolts so that the rotor bearing can be rotated together with the rotation of the main shaft, and includes a shrink disc configured to disengage the rotor bearing from the main shaft when a rotational torque of the main shaft exceeds the designated frictional force.

3. The power transmission apparatus according to claim 1, wherein the main shaft is an integral shaft, one bearing of the pair of first bearings is a toroidal roller bearing, and a second bearing of the pair of first bearings is a spherical roller bearing.

4. The power transmission apparatus according to claim 1, wherein the electric generator is supported by a supporter connected to a shaft housing provided outside of the main shaft, and dampers are provided between the supporter and the electric generator.

5. The power transmission apparatus according to claim 2, wherein the main shaft is an integral shaft, a front bearing of the pair of first bearings is a toroidal roller bearing, and a rear bearing of the pair of first bearings is a spherical roller bearing, and the front bearing is closer than the rear bearing to the apparatus rotor.

6. The power transmission apparatus according to claim 1, wherein each of the pair of second bearings includes an outer wheel and an inner wheel, the inner wheel being closer to the apparatus rotor than the outer wheel for each of the pair of second bearings, an outer circumference of each of the bearing housings are respectively fixed to the stator housing by bolts, and each of the bearing housings includes a wheel housing surrounding an inside of an outer wheel of each of the pair of second bearings and the an outer wheel of each of the pair of second bearings, and a cover fixed to an outer end of the wheel housing to press the outer wheel of each of the pair of second bearings inwardly towards the apparatus rotor.

7. The power transmission apparatus according to claim 1, wherein each of the pair of second bearings includes an outer wheel and an inner wheel, the inner wheel being closer to the apparatus rotor than the outer wheel for each of the pair of second bearings, wherein pushing units that respectively push the inner wheels of the pair of second bearings inwardly towards the apparatus rotor are provided on an outer circumference of the rotor bearing outside of the one of the pair of second bearings, and each of the pushing units includes a spiral part formed at the outer circumference of the rotor bearing, a contact ring closely contacting the inner wheels of the pair of second bearings, and a pushing nut coupled with the spiral part to push the contact ring inwardly towards the apparatus rotor.

* * * * *